(12) United States Patent
Degertekin

(10) Patent No.: US 7,797,757 B2
(45) Date of Patent: Sep. 14, 2010

(54) CANTILEVERS WITH INTEGRATED ACTUATORS FOR PROBE MICROSCOPY

(75) Inventor: Fahrettin Levent Degertekin, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 415 days.

(21) Appl. No.: 11/838,547

(22) Filed: Aug. 14, 2007

(65) Prior Publication Data
US 2008/0209988 A1 Sep. 4, 2008

Related U.S. Application Data

(60) Provisional application No. 60/837,803, filed on Aug. 15, 2006.

(51) Int. Cl.
*G01Q 20/04* (2010.01)
(52) U.S. Cl. ............ 850/7; 850/6; 850/14; 850/33
(58) Field of Classification Search ........ 73/105; 850/6–7, 14, 33
See application file for complete search history.

(56) References Cited

U.S. PATENT DOCUMENTS

| | | | |
|---|---|---|---|
| 5,231,286 A | 7/1993 | Kajimura et al. | |
| 5,245,863 A | 9/1993 | Kajimura et al. | |
| 5,247,186 A | 9/1993 | Toda | |
| 5,253,515 A | 10/1993 | Toda et al. | |
| 5,260,567 A | 11/1993 | Kuroda et al. | |
| 5,445,011 A | 8/1995 | Ghislain et al. | |
| 5,465,611 A | 11/1995 | Ruf et al. | |
| 5,471,458 A * | 11/1995 | Oguchi et al. | 369/126 |
| 5,689,107 A | 11/1997 | Hsu et al. | |
| 5,900,729 A | 5/1999 | Moser et al. | |
| 5,909,981 A | 6/1999 | Neuber, Jr. | |
| 5,923,033 A | 7/1999 | Takayama et al. | |

(Continued)

FOREIGN PATENT DOCUMENTS

EP 1350758 A2 * 10/2003

(Continued)

OTHER PUBLICATIONS

Yaralioglu et al., "Analysis and Design of an Interdigital Cantilever as a Displacement Sensor" Journal of Applied Physics, Jun. 15, 1998, vol. 83, No. 12, pp. 7405-7415.

(Continued)

*Primary Examiner*—Thomas P Noland
(74) *Attorney, Agent, or Firm*—Bryan W. Bockhop; Bockhop & Associates, LLC

(57) ABSTRACT

An atomic force microscopy sensor includes a substrate, a cantilever beam and an electrostatic actuator. The cantilever beam has a proximal end and an opposite distal end. The proximal end is in a fixed relationship with the substrate and the cantilever beam is configured so that the distal end is in a moveable relationship with respect to the substrate. The electrostatic actuator includes a first electrode that is coupled to the cantilever beam adjacent to the proximal end and a spaced apart second electrode that is in a fixed relationship with the substrate. When an electrical potential is applied between the first electrode and the second electrode, the first electrode is drawn to the second electrode, thereby causing the distal end of the cantilever beam to move.

20 Claims, 4 Drawing Sheets

U.S. PATENT DOCUMENTS

| | | |
|---|---|---|
| 6,249,747 B1 | 6/2001 | Binnig et al. |
| 6,272,907 B1 | 8/2001 | Neukermans et al. |
| 6,291,927 B1 | 9/2001 | Percin et al. |
| 6,310,990 B1 | 10/2001 | Putnam et al. |
| 6,400,166 B2 | 6/2002 | Babson et al. |
| 6,445,109 B2 | 9/2002 | Percin et al. |
| 6,446,486 B1 * | 9/2002 | deBoer et al. .................... 73/9 |
| 6,567,572 B2 | 5/2003 | Degertekin et al. |
| 6,672,144 B2 | 1/2004 | Adderton et al. |
| 6,676,813 B1 | 1/2004 | Pelekhov et al. |
| 6,836,112 B2 | 12/2004 | Hennessy |
| 6,862,923 B2 | 3/2005 | Buguin et al. |
| 6,862,924 B2 | 3/2005 | Xi et al. |
| 6,882,429 B1 | 4/2005 | Weitekamp et al. |
| 6,953,519 B2 * | 10/2005 | Shirakawabe et al. .. 204/192.32 |
| 7,395,698 B2 * | 7/2008 | Degertekin .................. 73/105 |
| 7,441,447 B2 * | 10/2008 | Degertekin et al. ........... 73/105 |
| 7,461,543 B2 * | 12/2008 | Degertekin .................. 73/105 |
| 7,552,625 B2 * | 6/2009 | Degertekin .................. 73/105 |
| 2001/0000279 A1 | 4/2001 | Daniels et al. |
| 2001/0013574 A1 | 8/2001 | Warren et al. |
| 2001/0035700 A1 | 11/2001 | Percin et al. |
| 2001/0049959 A1 | 12/2001 | Neukermans et al. |
| 2003/0042409 A1 | 3/2003 | Warren et al. |
| 2004/0065821 A1 | 4/2004 | Warren et al. |
| 2004/0206165 A1 | 10/2004 | Minne et al. |
| 2004/0216517 A1 | 11/2004 | Xi et al. |
| 2005/0066714 A1 | 3/2005 | Adderton et al. |
| 2005/0173234 A1 * | 8/2005 | Nielson et al. ............. 200/181 |
| 2005/0180678 A1 | 8/2005 | Panepucci et al. |
| 2007/0012094 A1 * | 1/2007 | Degertekin et al. ........... 73/105 |
| 2007/0103697 A1 * | 5/2007 | Degertekin ................. 356/501 |
| 2007/0121477 A1 * | 5/2007 | Belov et al. ................. 369/126 |
| 2008/0011046 A1 * | 1/2008 | Workman et al. ............ 73/1.89 |
| 2008/0307865 A1 * | 12/2008 | Degertekin .................. 73/105 |

FOREIGN PATENT DOCUMENTS

| | | | |
|---|---|---|---|
| JP | 05248810 A | | 9/1993 |
| JP | 07065428 A | | 3/1995 |
| JP | 08250779 A | * | 9/1996 |
| JP | 10090287 A | | 4/1998 |
| JP | 10209527 A | * | 8/1998 |
| JP | 2002236263 A | * | 8/2002 |
| JP | 2002240274 A | * | 8/2002 |
| JP | 2004093574 A | | 3/2004 |
| WO | WO 9834269 A1 | * | 8/1998 |
| WO | WO 2005008679 A1 | * | 1/2005 |

OTHER PUBLICATIONS

Solgaard et al., "Deformable Grating Optical Modulator" Optics Letters, May 1, 1992, vol. 17, No. 9, pp. 688-690.

Cooper et al., "High-Resolution Micromachined Itnerferometric Accelerometer" Applied Physics Letters, May 29, 2000, vol. 70, No. 22, pp. 3316-3318.

Manalis et al., "Interdigital Cantilevers for Atomic Force Microscopy" Applied Physich Letters, Dec. 16, 1996, vol. 69, No. 25, pp. 3944-3946.

Wu, "Micromachining for Optical and Optoelectronic Systems" Proceedings of the IEEE, Nov. 1997, vol. 85, No. 11, pp. 1833-1856.

Chen et al., "Overview of Three-Dimensional Shape Measurement Using Optical Methods" Optical Engineering, Jan. 2000, vol. 39, No. 1, pp. 10-22.

Shiono et al., "Planar-optic-disk Pickup with Diffractive Micro-optics" Applied Optics, Nov. 1, 1994, vol. 33, No. 31, pp. 7350-7355.

Dewitt et al., "Range-finding Method Using Diffraction Gratings" Applied Optics, May 10, 1995, vol. 34, No. 14, pp. 2510-2521.

Jahns et al., "Planar Integration of Free-space Optical Components" Applied Optics, May 1, 1989, vol. 28, No. 9, pp. 1602-1607.

* cited by examiner

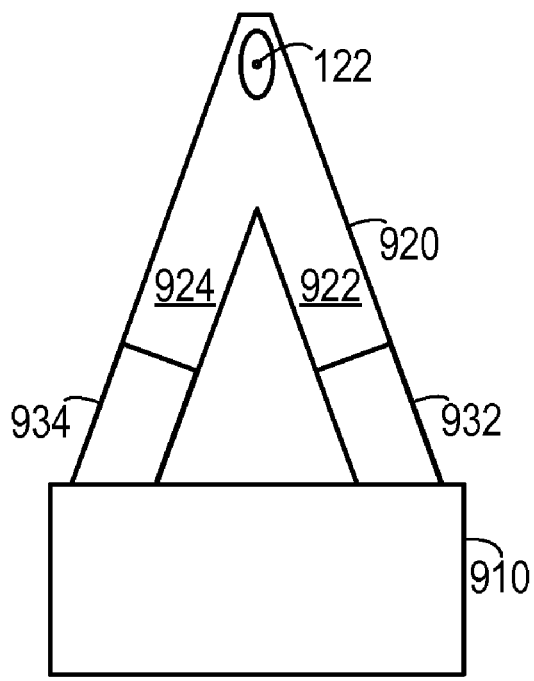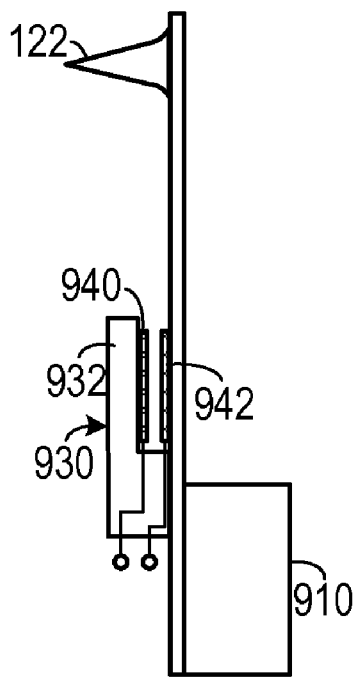
FIG. 9A   FIG. 9B
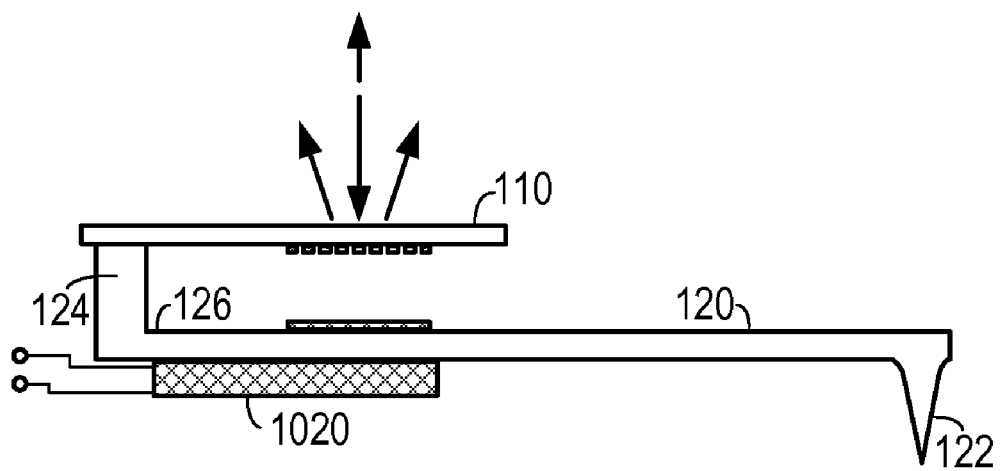
FIG. 10

CANTILEVERS WITH INTEGRATED ACTUATORS FOR PROBE MICROSCOPY

CROSS-REFERENCE TO RELATED APPLICATION(S)

This application claims the benefit of U.S. Provisional Patent Application Ser. No. 60/837,803, filed Aug. 15, 2006, the entirety of which is hereby incorporated herein by reference.

This application is related to the following pending U.S. patent applications and incorporates them herein by reference: Ser. No. 11/405,051, filed on Apr. 17, 2006; Ser. No. 11/297,097, filed on Dec. 8, 2005 (Publ. No. US-2006-0227845-A1); Ser. No. 11/260,238, filed on Oct. 28, 2005 (Publ. No. US-2007-0103697-A1); Ser. No. 11/476,625 (Publ. No. US-2007-0012094-A1), filed on Jun. 29, 2006; Ser. No. 11/398,650, filed on Apr. 6, 2006 (Publ. No. US-2006-0283338-A1); Ser. No. 11/548,005, filed on Oct. 10, 2006; Ser. No. 11/548,531, filed on Oct. 11, 2006 (Publ. No. US-2007-0107502-A1); Ser. No. 11/552,274, filed on Oct. 24, 2006 (Publ. No. US-2007-0089496-A1); and Ser. No. 11/777,518, filed on Jul. 13, 2007.

STATEMENT OF GOVERNMENT INTEREST

This invention was made with support from the U.S. government under grant number ECS 0348582, awarded by National Science Foundation. The government may have certain rights in the invention.

BACKGROUND OF THE INVENTION

1. Field of the Invention

The present invention relates to atomic force microscopy and, more specifically, to a cantilever actuation system employed in atomic force microscopy.

2. Description of the Prior Art

In atomic force microscopy, a probe at the end of a cantilever beam is used to image the surface properties of a sample with near-atomic precision. Typically, an atomic force microscope (AFM) uses a mechanical actuator to move a sample into a position in which it interacts with the tip of a cantilever-mounted probe. The cantilever beam is then caused to move up and down, usually according to its resonant frequency, and the tip of the probe interacts with the sample. Variations in the movement of the cantilever beam are detected by measuring movement of a light beam reflected off of the cantilever into a detector. The sample is then moved by the actuator as the surface of the sample is being imaged. Typical actuators tend to be relatively slow, relative to the resonant frequency of the cantilever.

Therefore, there is a need for an integrated cantilever actuator that interacts directly with a cantilever beam.

SUMMARY OF THE INVENTION

The disadvantages of the prior art are overcome by the present invention which, in one aspect, is an atomic force microscopy sensor that includes a substrate, a cantilever beam and an electrostatic actuator. The cantilever beam has a proximal end and an opposite distal end. The proximal end is in a fixed relationship with the substrate and the cantilever beam is configured so that the distal end is in a moveable relationship with respect to the substrate. The electrostatic actuator includes a first electrode that is coupled to the cantilever beam adjacent to the proximal end and a spaced apart second electrode that is in a fixed relationship with the substrate. When an electrical potential is applied between the first electrode and the second electrode, the first electrode is drawn to the second electrode, thereby causing the distal end of the cantilever beam to move.

In another aspect, the invention is an atomic force microscopy sensor that includes a substrate, a cantilever beam and a piezoelectric actuator. The cantilever beam has a proximal end and an opposite distal end. The proximal end is in a fixed relationship with the substrate and the cantilever beam is configured so that the distal end is in a moveable relationship with respect to the substrate. The piezoelectric actuator includes a piezoelectric member affixed to the cantilever beam adjacent to the proximal end. When an electrical potential is applied to the piezoelectric member, the piezoelectric member will deform along a predetermined dimension, thereby causing the cantilever beam to bend.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 9A is a bottom schematic view of an embodiment employing a V-shaped cantilever.

FIG. 9B is a side schematic view of the embodiment shown in FIG. 9A.

FIG. 10 is a side schematic view of an embodiment employing a piezoelectric actuator.

DETAILED DESCRIPTION OF THE INVENTION

Figure 1:
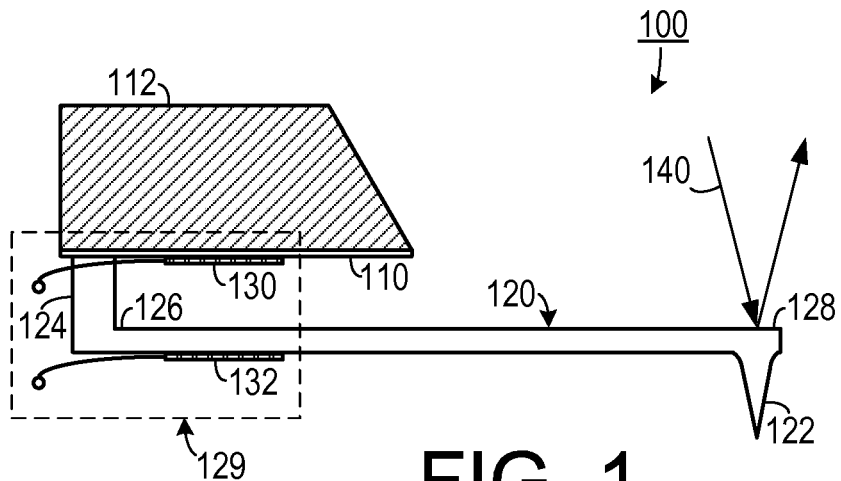
FIG. 1 is a side schematic view of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As will be described more fully below, the present invention includes cantilever beam atomic force microscopy structures that employ integrated actuators. Such actuators may include electrostatic and piezoelectric actuators. Integrated actuators enable imaging with a speed that is limited by the integrated actuator rather than an external actuator. Integrated detector systems may also be employed.

As shown in FIG. 1, one embodiment of the invention includes an atomic force microscopy sensor 100, which includes a substrate 110 that can be affixed to an attachment surface 112. A micromachined cantilever beam 120, having a proximal end 126 and an opposite distal end 128, is spaced apart from the substrate 110. The proximal end 126 is in a fixed relationship with the substrate 110 through a spacer 124 and a probe 122 is affixed to the distal end 128. The cantilever beam 120 is configured so that the distal end 128 is in a moveable relationship with respect to the substrate 110. An electrostatic actuator 129 controls displacement of the distal end 128 of the cantilever beam 120. The electrostatic actuator 129 includes a first electrode 132 that is coupled to the cantilever beam 120 adjacent to the proximal end 126 and a spaced apart second electrode 130 that is affixed to the substrate 110. When an electrical potential is applied between the first electrode 132 and the second electrode 130, the first electrode 132 is drawn to the second electrode 130, thereby causing the distal end 128 of the cantilever beam 120 to move upwardly. If an electrode is applied to a conductive substrate or cantilever, an insulating layer should be deposited before the deposition of the electrode.

The cantilever beam 120 can be directly surface micromachined on the substrate 110 (which can be formed from a material such as a silicon wafer), or it can be bonded to the substrate 110. The electrodes 130 and 132 can be formed by deposition and patterning of a thin metal film. The space between the cantilever beam 120 and the substrate 110 can be adjusted to have adequate probe displacement range for a give AFM application. Typically, the gap would be between 0.1 μm and 10 μm. The displacement of the probe 122 can be measured in one of several ways, including the beam bounce method in which a light beam 140 is bounced off of the cantilever beam and a detector (not shown) determines the amount of displacement based on the angle of the reflected beam.

Figure 2:
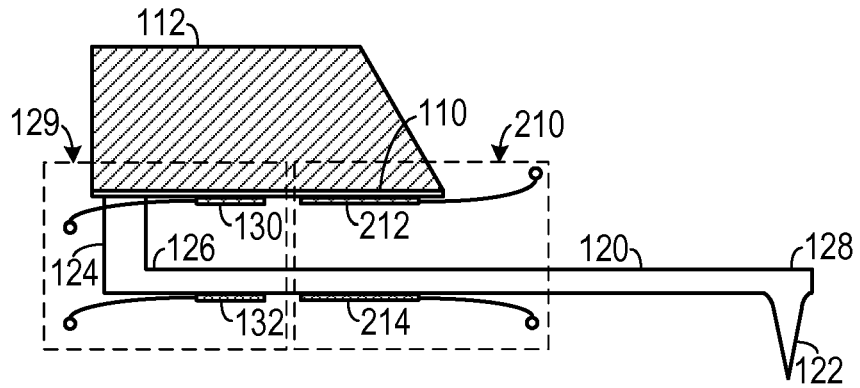
FIG. 2 is a side schematic view of a second embodiment of the invention.

As shown in FIG. 2, one embodiment includes a capacitive sensing element 210 that provides feedback regarding the displacement of the position of the cantilever beam 120. The capacitive sensing element 210 includes a third electrode 214 that is coupled to the cantilever beam 120 and a fourth electrode 212 that is affixed to the substrate 212 that forms a capacitor. The space between the third electrode 214 and the fourth electrode 212 acts as a dielectric, which varies in thickness as the distance between the cantilever beam 120 and the substrate 110 changes. This causes the capacitance of the capacitive sensing element 210 to be representative of the distance between the third electrode 214 and the fourth electrode 212, which is indicative of the displacement of the distal end 128 of the cantilever beam 120.

Figure 3:
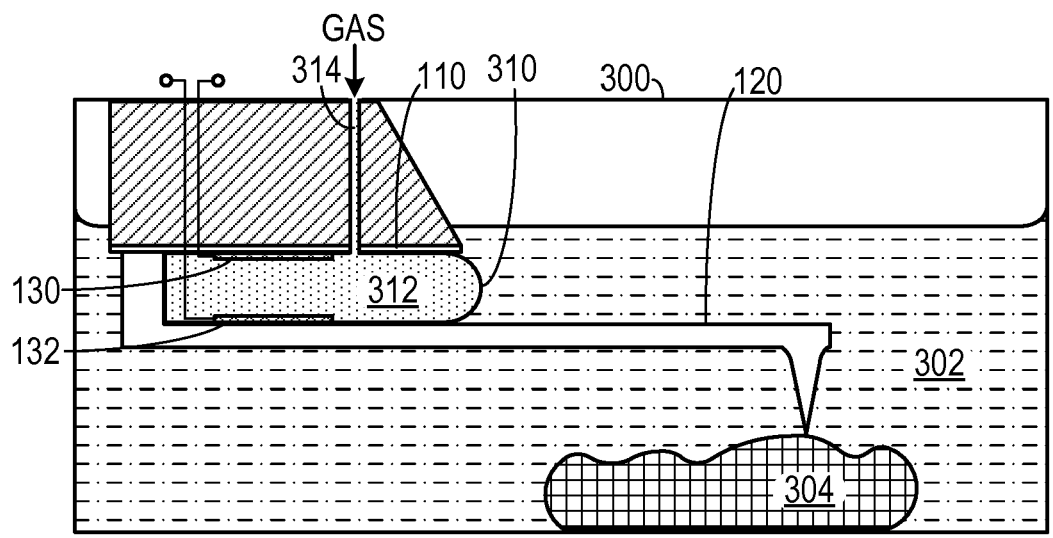
FIG. 3 is a side schematic view of a third embodiment of the invention.

As shown in FIG. 3, a sealing membrane 310 (such as a PECVD deposited nitride or oxide layer, or a polymer film, which can be deposited and patterned) may be placed between the cantilever beam 120 the substrate 110 to define a chamber 312 therebetween. The chamber 312 is filled with a non-conductive gas (e.g., air) and the sealing membrane 310 prevents liquids from entering the chamber 312. This embodiment may be placed in a vessel 300 and used to measure features of a sample 304 in a conductive or dielectric liquid 302. A passage 314 may be drilled into the chamber 312. The passage 314 allows application of a gas to the chamber 312 to create a positive pressure in the chamber 312 relative to a liquid 302 (or other fluid) into which the sensor is placed.

Figure 4:
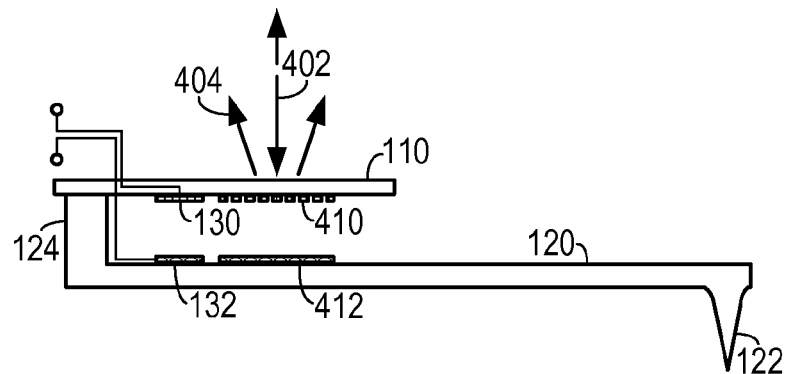
FIG. 4 is a side schematic view of a fourth embodiment of the invention.

As shown in FIG. 4, the substrate 110 may be made of a transparent material. This allows placement of a diffraction grating 410 on the substrate 110. A reflective surface 412 is then disposed on the cantilever beam 412 in a location so that when a beam 402 of electromagnetic radiation is directed to the reflective surface 412, a reflected beam 404 interacts with the diffraction grating 410 so as to form a diffraction pattern that is indicative of a displacement between the cantilever beam 120 and the substrate 110.

Figure 5:
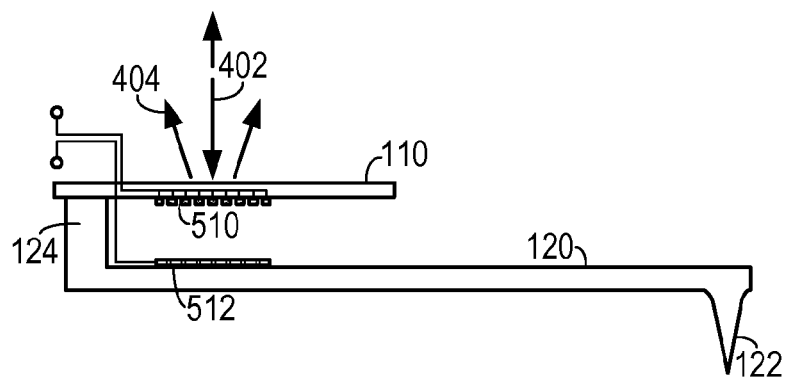
FIG. 5 is a side schematic view of a fifth embodiment of the invention.

In one embodiment, as shown in FIG. 5, the second electrode 510 may be patterned to form a diffraction grating and the reflective surface 512 may also act as the first electrode, thereby making a combined actuator and displacement sensor.

Figure 6A:
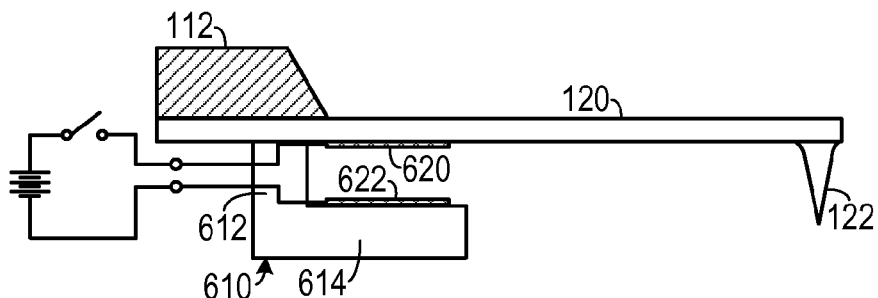
FIG. 6A is a side schematic view of a sixth embodiment of the invention.
Figure 6B:
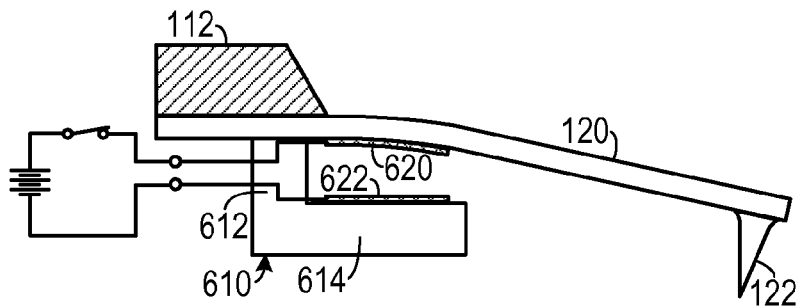
FIG. 6B is a side schematic view of the embodiment shown in FIG. 6A in which the cantilever is in an actuated state.

As shown in FIGS. 6A and 6B, in one embodiment, the cantilever beam 120 is affixed directly to an attachment surface 112 and a frame 610 depends from a portion of the cantilever beam 120. The frame 610 includes a longitudinal structure 612 that is affixed to the cantilever beam 120 and rigid beam 614 that extends laterally from the longitudinal structure 612. The rigid beam 614 is spaced apart from the cantilever beam 120 and defines a gap therebetween. A first electrode 620 is placed on the cantilever beam 120 and a second electrode 622 is disposed on the rigid beam 614. When no voltage is applied to first electrode 620 and the second electrode 622, the cantilever beam 120 is not displaced. However, when a voltage is applied to first electrode 620 and the second electrode 622, the cantilever beam 120 is displaced in a downward direction.

Figure 6C:
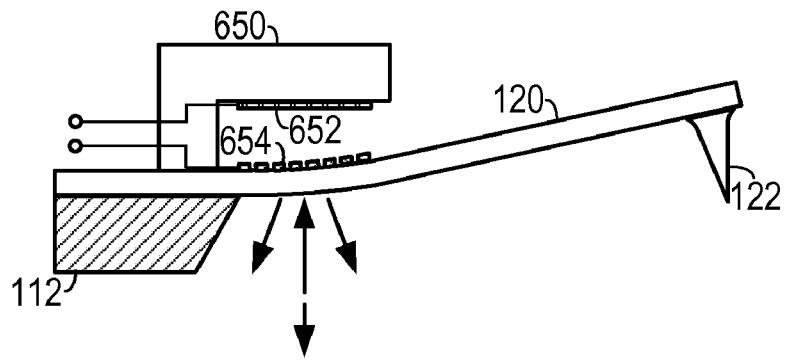
FIG. 6C is a side schematic view of an embodiment in which a rigid beam actuator is configured to retract a cantilever beam.

As shown in FIG. 6C, the frame 650 may be applied the side of the cantilever beam 120 opposite of the probe 122 to allow the cantilever beam 120 to be pulled upwardly when a voltage is applied between the first electrode 654 and the second electrode 652. This embodiment also facilitates optical interferometric displacement detection if a portion of the cantilever beam 120 is transparent and the first electrode 654 is patterned as a diffraction grating.

Figure 7A:
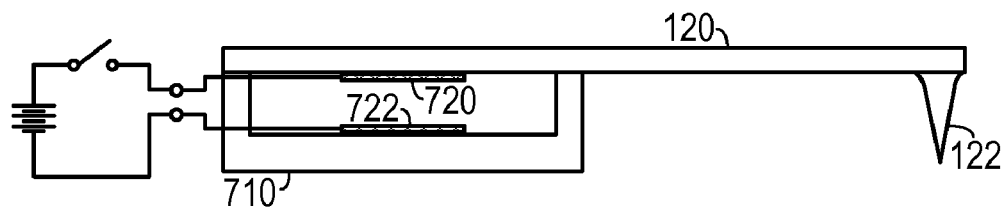
FIG. 7A is a side schematic view of a seventh embodiment of the invention.
Figure 7B:
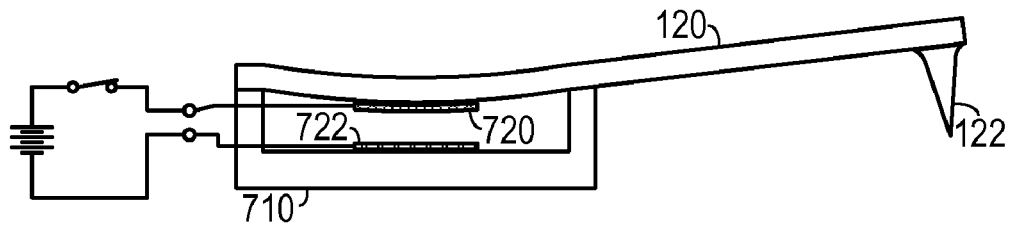
FIG. 7B is a side schematic view of the embodiment shown in FIG. 7A in which the cantilever beam is in a retracted state.

As shown in FIGS. 7A and 7B, a frame 710 can be affixed to the cantilever beam 120 so that attraction between the first electrode 720 and the second electrode 722 causes the cantilever beam 120 to deflect away from the frame 710.

Figure 8:
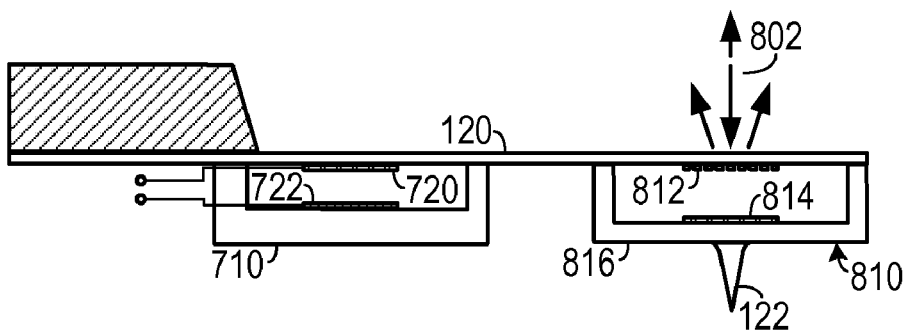
FIG. 8 is a side schematic view of an eighth embodiment of the invention.

As shown in FIG. 8, the embodiment shown in FIGS. 7A and 7B may be used with an optical displacement sensor 810 (such as a FIRAT-type membrane-mounted probe) mounted on the distal end of the cantilever beam 120. A probe 122 is mounted on the membrane-type optical displacement sensor 810 and the sensor 810 includes a reflective surface 814 and a diffraction grating 812 mounted on a membrane 816 that is spaced apart from the distal end of the cantilever beam 120. The diffraction grating 812 allows sensing of probe displacement using a reflected optical beam 802.

As shown in FIGS. 9A and 9B, the cantilever beam can be a V-shaped structure 920 that includes a first leg 922 and a spaced apart second leg 924. This embodiment may be used in torsion modes for lateral force imaging. Both legs are coupled to the substrate 910. The electrostatic actuator comprises a first member 932 that is coupled to the first leg 922 and a second member 934 that is coupled to the second leg 924. The first member 932 can drive movement of the first leg 922 independently from movement of the second leg 924. The second member 934 can drive movement of the second leg 924 independently from movement of the first leg 922. Thus, by applying out-of-phase voltages to the actuator members 932 and 934, the actuator can cause the probe 122 to move laterally as well as up-and-down. This generates both in-plane motion and out-of-plane motion of the probe 122.

As shown in FIG. 10, one embodiment uses a piezoelectric actuator that includes a piezoelectric member 1020 affixed to the cantilever beam 120 adjacent to the proximal end 126. When an electrical potential is applied to the piezoelectric member 1020, the piezoelectric member 1020 will deform along a predetermined dimension, thereby causing the cantilever beam to bend. Also, all of the displacement detection mechanisms disclosed above (e.g., capacitive, optical, etc.) may be used with the embodiment, and it may be used with a V-shaped cantilever beam.

The piezoelectric member 1020 can be, for example, a film of a material such as ZnO or AlN, or one of many other thin film piezoelectric materials. Typically the probe 122 should be longer than the thickness of the piezoelectric member 1020.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An atomic force microscopy sensor, comprising:
   a. a substrate, a portion of which is transparent;
   b. a cantilever beam having a proximal end and an opposite distal end, the proximal end in a fixed relationship with the substrate and the cantilever beam is configured so that the distal end is in a moveable relationship with respect to the substrate;
   c. an electrostatic actuator that includes a first electrode that is coupled to the cantilever beam adjacent to the proximal end and a spaced apart second electrode that is affixed to the substrate, so that when an electrical potential is applied between the first electrode and the second electrode, the first electrode is drawn to the second electrode, thereby causing the distal end of the cantilever beam to move;
   d. a probe extending from the distal end of the cantilever beam;
   e. a diffraction grating disposed on the substrate; and
   f. a reflective surface disposed on the cantilever beam in a location so that when a beam of electromagnetic radiation is directed to the reflective surface, a reflected beam interacts with the diffraction grating so as to form a diffraction pattern that is indicative of a displacement between the cantilever beam and the substrate.

2. The atomic force microscopy sensor of claim 1, wherein the diffraction grating is formed by the first electrode and the reflective surface is formed by the second electrode.

3. The atomic force microscopy sensor of claim 1, further comprising:
   a. a third electrode that is coupled to the cantilever beam and spaced apart from the first electrode; and
   b. a fourth electrode that is in a fixed relationship to the substrate and spaced apart from the third electrode,
the third electrode and the fourth electrode disposed so as to form a capacitor so that a displacement between the third electrode and the fourth electrode results in a corresponding capacitance that is indicative of a displacement of the distal end of the cantilever beam.

4. The atomic force microscopy sensor of claim 1, wherein the probe is mounted on a membrane coupled to the distal end of the cantilever beam.

5. The atomic force microscopy sensor of claim 1, further comprising a piezoelectric actuator that includes a piezoelectric member affixed to the cantilever beam adjacent to the proximal end so that when an electrical potential is applied to the piezoelectric member, the piezoelectric member will deform along a predetermined dimension, thereby causing the cantilever beam to bend.

6. The atomic force microscopy sensor of claim 1, wherein the substrate defines a passage that opens into the chamber that is configured to allow application of a gas to the chamber so as to create a positive pressure in the chamber relative to a fluid into which the sensor is placed.

7. The atomic force microscopy sensor of claim 1, further comprising a frame depending from a portion of the cantilever beam adjacent to the proximal end, the frame including:
   a. a longitudinal structure affixed to the cantilever beam; and
   b. rigid beam, extending laterally from the longitudinal structure so as to be spaced apart from the cantilever beam and to define a gap therebetween, upon which the second electrode is disposed.

8. An atomic force microscopy sensor, comprising:
   a. a substrate;
   b. a cantilever beam having a proximal end and an opposite distal end, the proximal end in a fixed relationship with the substrate and the cantilever beam is configured so that the distal end is in a moveable relationship with respect to the substrate;
   c. an electrostatic actuator that includes a first electrode that is coupled to the cantilever beam adjacent to the proximal end and a spaced apart second electrode that is affixed to the substrate, so that when an electrical potential is applied between the first electrode and the second electrode, the first electrode is drawn to the second electrode, thereby causing the distal end of the cantilever beam to move;
   d. a probe extending from the distal end of the cantilever beam;
   e. a sealing membrane disposed between a portion of the cantilever beam and a portion of the substrate so as to define a chamber that encloses the first electrode and the second electrode, the chamber filled with a non-conductive gas, the sealing membrane configured to prevent liquids from entering the chamber.

9. The atomic force microscopy sensor of claim 8, wherein the substrate defines a passage that opens into the chamber that is configured to allow application of a gas to the chamber so as to create a positive pressure in the chamber relative to a fluid into which the sensor is placed.

10. The atomic force microscopy sensor of claim 8, wherein the diffraction grating is formed by the first electrode and the reflective surface is formed by the second electrode.

11. The atomic force microscopy sensor of claim 8, further comprising:
   a. a third electrode that is coupled to the cantilever beam and spaced apart from the first electrode; and
   b. a fourth electrode that is in a fixed relationship to the rigid beam and spaced apart from the third electrode,
the third electrode and the fourth electrode disposed so as to form a capacitor so that a displacement between the third electrode and the fourth electrode results in a corresponding capacitance that is indicative of a displacement of the distal end of the cantilever beam.

12. The atomic force microscopy sensor of claim 8, wherein the cantilever beam comprises a V-shaped structure that includes a first leg and a spaced apart second leg, both legs coupled to the substrate, and wherein the electrostatic actuator comprises a first member that is coupled to the first leg and a second member that is coupled to the second leg, the first member configured to drive movement of the first leg and the second member configured to drive movement of the second leg.

13. The atomic force microscopy sensor of claim 8, further comprising a piezoelectric actuator that includes a piezoelectric member affixed to the cantilever beam adjacent to the proximal end so that when an electrical potential is applied to the piezoelectric member, the piezoelectric member will deform along a predetermined dimension, thereby causing the cantilever beam to bend.

14. An atomic force microscopy sensor, comprising:
 a. a substrate;
 b. a cantilever beam, a portion of which is transparent, having a proximal end and an opposite distal end, the proximal end in a fixed relationship with the substrate and the cantilever beam is configured so that the distal end is in a moveable relationship with respect to the substrate;
 c. an electrostatic actuator that includes a first electrode that is coupled to the cantilever beam adjacent to the proximal end and a spaced apart second electrode that is in a fixed relationship with the substrate, so that when an electrical potential is applied between the first electrode and the second electrode, the first electrode is drawn to the second electrode, thereby causing the distal end of the cantilever beam to move;
 d. a probe extending from the distal end of the cantilever beam;
 e. a frame depending from a portion of the cantilever beam adjacent to the proximal end, the frame including:
  i. a longitudinal structure affixed to the cantilever beam; and
  ii. rigid beam, extending laterally from the longitudinal structure so as to be spaced apart from the cantilever beam and to define a gap therebetween, upon which the second electrode is disposed; and
 f. a diffraction grating disposed on the portion of the cantilever beam; and
 g. a reflective surface disposed on the rigid beam in a location so that when a beam of electromagnetic radiation is directed to the reflective surface, a reflected beam interacts with the diffraction grating so as to form a diffraction pattern that is indicative of a displacement between the cantilever beam and the rigid beam.

15. The atomic force microscopy sensor of claim 14, wherein the diffraction grating is formed by the first electrode and the reflective surface is formed by the second electrode.

16. The atomic force microscopy sensor of claim 14, further comprising:
 a. a third electrode that is coupled to the cantilever beam and spaced apart from the first electrode; and
 b. a fourth electrode that is in a fixed relationship to the rigid beam and spaced apart from the third electrode,
the third electrode and the fourth electrode disposed so as to form a capacitor so that a displacement between the third electrode and the fourth electrode results in a corresponding capacitance that is indicative of a displacement of the distal end of the cantilever beam.

17. The atomic force microscopy sensor of claim 14, wherein the cantilever beam comprises a V-shaped structure that includes a first leg and a spaced apart second leg, both legs coupled to the substrate, and wherein the electrostatic actuator comprises a first member that is coupled to the first leg and a second member that is coupled to the second leg, the first member configured to drive movement of the first leg and the second member configured to drive movement of the second leg.

18. The atomic force microscopy sensor of claim 14, wherein the probe is mounted on a membrane coupled to the distal end of the cantilever beam.

19. The atomic force microscopy sensor of claim 14, further comprising a sealing membrane disposed between a portion of the cantilever beam and a portion of the substrate so as to define a chamber that encloses the first electrode and the second electrode, the chamber filled with a non-conductive gas, the sealing membrane configured to prevent liquids from entering the chamber.

20. The atomic force microscopy sensor of claim 19, wherein the substrate defines a passage that opens into the chamber that is configured to allow application of a gas to the chamber so as to create a positive pressure in the chamber relative to a fluid into which the sensor is placed.

* * * * *